(12) United States Patent
Wehling et al.

(10) Patent No.: US 9,475,390 B2
(45) Date of Patent: Oct. 25, 2016

(54) METHOD AND DEVICE FOR PROVIDING A USER INTERFACE IN A VEHICLE

(75) Inventors: Ulrike Wehling, Braunschweig (DE); Thomas Fabian, Hildesheim (DE)

(73) Assignee: VOLKSWAGEN AG, Wolfsburg (DE)

( * ) Notice: Subject to any disclaimer, the term of this patent is extended or adjusted under 35 U.S.C. 154(b) by 380 days.

(21) Appl. No.: 13/383,185

(22) PCT Filed: Jul. 7, 2010

(86) PCT No.: PCT/EP2010/059744
§ 371 (c)(1),
(2), (4) Date: Jul. 17, 2012

(87) PCT Pub. No.: WO2011/003947
PCT Pub. Date: Jan. 13, 2011

(65) Prior Publication Data
US 2012/0274549 A1    Nov. 1, 2012

(30) Foreign Application Priority Data

Jul. 7, 2009   (DE) ................ 10 2009 032 069

(51) Int. Cl.
*G06F 3/01*        (2006.01)
*B60K 37/06*       (2006.01)
(Continued)

(52) U.S. Cl.
CPC ............... *B60K 37/06* (2013.01); *B60K 35/00* (2013.01); *G06F 3/017* (2013.01); *B60K 2015/03032* (2013.01); *B60K 2350/1004* (2013.01); *B60K 2350/1012* (2013.01); *B60K 2350/1024* (2013.01); *B60K 2350/203* (2013.01); *B60K 2350/206* (2013.01); *B60K 2350/2013* (2013.01); *B60K 2350/2047* (2013.01); *B60K 2350/35* (2013.01); *B60K 2350/355* (2013.01); *B60K 2350/901* (2013.01); *B60K 2350/903* (2013.01)

(58) Field of Classification Search
CPC ............ G06F 3/00; G06F 3/033; G09G 5/00
USPC .................. 345/7–9, 173–178; 715/860, 863
See application file for complete search history.

(56) References Cited

U.S. PATENT DOCUMENTS

| 5,270,689 A | 12/1993 | Hermann ..................... 345/145 |
| 6,769,320 B1 | 8/2004 | Bollgohn et al. ............ 73/866.3 |
| 2003/0007227 A1* | 1/2003 | Ogino ........................... 359/227 |

(Continued)

FOREIGN PATENT DOCUMENTS

| DE | 19944324 A1 | 3/2001 | ............ B60R 16/02 |
| DE | 10022321 A1 | 11/2001 | ............ B60K 37/06 |

(Continued)

OTHER PUBLICATIONS

Zumo 660 series Owners Manual (Published May 2009).*
(Continued)

*Primary Examiner* — Amr Awad
*Assistant Examiner* — Wing Chow
(74) *Attorney, Agent, or Firm* — Slayden Grubert Beard PLLC (57) ABSTRACT

In a method for providing a user interface in a vehicle, control objects and/or display objects can be displayed on a display surface (1) arranged in the vehicle, a gesture in a detection space (12) arranged in front of the display surface (1) is detected, the detected gesture is associated with a control object and/or display object and a control command, and the control command is carried out.

19 Claims, 3 Drawing Sheets

(51) Int. Cl.
  *B60K 35/00* (2006.01)
  *B60K 15/03* (2006.01)

(56) References Cited

U.S. PATENT DOCUMENTS

| | | | |
|---|---|---|---|
| 2004/0266460 A1* | 12/2004 | Reynolds | 455/457 |
| 2006/0066507 A1* | 3/2006 | Yanagisawa | 345/7 |
| 2006/0279528 A1* | 12/2006 | Schobben | B60K 35/00 345/156 |
| 2007/0013624 A1* | 1/2007 | Bourhill | 345/84 |
| 2007/0182718 A1 | 8/2007 | Schoener et al. | 345/173 |
| 2007/0229472 A1* | 10/2007 | Bytheway | 345/173 |
| 2007/0262953 A1* | 11/2007 | Zackschewski | B60K 35/00 345/156 |
| 2008/0129684 A1* | 6/2008 | Adams | B60K 35/00 345/156 |
| 2009/0027332 A1 | 1/2009 | Cieler et al. | 345/156 |
| 2009/0040196 A1* | 2/2009 | Duckstein | B60K 35/00 345/204 |
| 2009/0080099 A1* | 3/2009 | Tanimoto et al. | 359/893 |
| 2009/0327977 A1* | 12/2009 | Bachfischer et al. | 715/863 |
| 2010/0005427 A1* | 1/2010 | Zhang | G06F 3/011 715/863 |
| 2011/0205162 A1 | 8/2011 | Wäller et al. | 345/173 |
| 2012/0028701 A1* | 2/2012 | Gomez et al. | 463/25 |

FOREIGN PATENT DOCUMENTS

| | | | | |
|---|---|---|---|---|
| DE | 10147940 A1 | 5/2003 | | B60K 37/06 |
| DE | 10324579 A1 | 12/2004 | | B60R 11/02 |
| DE | 102005020155 A1 | 11/2006 | | B60K 35/00 |
| DE | 102006037156 A1 | 9/2007 | | B60R 16/02 |
| DE | 102007039442 A1 | 2/2009 | | B60K 35/00 |
| DE | 102007048599 A1 | 4/2009 | | B60K 35/00 |
| EP | 0366132 A2 | 10/1988 | | B60R 16/02 |
| EP | 2018992 A1 | 6/2008 | | B60K 37/02 |
| JP | 2007283968 A | 11/2007 | | B60R 11/02 |
| KR | 1020040063156 A | 7/2004 | | C07D 487/04 |
| WO | WO 2007107368 A1 * | 9/2007 | | |

OTHER PUBLICATIONS

International PCT Search Report and Written Opinion, PCT/EP2010/059744, 12 pages, Nov. 2, 2010.

* cited by examiner

METHOD AND DEVICE FOR PROVIDING A USER INTERFACE IN A VEHICLE

CROSS-REFERENCE TO RELATED APPLICATIONS

This application is a U.S. National Stage Application of International Application No. PCT/EP2010/059744 filed Jul. 7, 2010, which designates the United States of America, and claims priority to German Application No. 10 2009 032 069.5 filed Jul. 7, 2009, the contents of which are hereby incorporated by reference in their entirety.

TECHNICAL FIELD

The present invention relates to a method and a device for providing a user interface in a vehicle. The device comprises a display surface, which is arranged in the vehicle. Operating objects and/or display objects may be displayed by means of the display surface.

BACKGROUND

In a vehicle, in particular in a motor vehicle, a plurality of electronic devices is provided whose operation has to be made possible for the driver or another passenger. For example, amongst these devices are a navigation system, a plurality of driver assistance systems as well as communications and multi-media applications, which, for example, comprise a telephone system and devices for playback of music and speech, as for example a radio or a CD player.

In order to be able to operate the manifold devices in the vehicle often multi-functional operating systems are applied in vehicles that comprise one or more multi-functional displays and operating elements by which the manifold devices integrated in the vehicle may be operated. In this case, the operation is based on and guided by information displayed on the multi-functional display(s). Furthermore, via the operating system it may be selected, which information shall be displayed on the multi-functional display.

Known from EP O 366 132 B1 is a multi-functional operating device where the selection of function groups and the selection of individual functions is carried out by means of a turn-push-switch and wherein the switch may be actuated in the direction of the axis of rotation. Known from DE 199 44 324 is a multi-functional operating device, which comprises a rotary control switch for selecting functions that are represented within a view box of a display. Arranged surrounding the rotary control switch are push-buttons, to which also view boxes of the display are assigned. Finally, known from DE 103 24 579 A1 is an operating device for controlling vehicle equipment comprising a touch-sensitive control panel.

Besides the above described operating elements that are arranged in an offset manner, it was further suggested to provide the display itself with a touch-sensitive surface and to provide a so-called touchscreen this way. Using such a touchscreen the operation is carried out thus that the user touches the touchscreen with his finger tip, as an example. The position of the contact and where applicable the movement during the contact are detected, evaluated and assigned to an operating step. In order to support the user during the operation virtual switches may be displayed on the display as graphical push buttons. A display device comprising a touch-sensitive surface employed in connection with a navigation system is described in DE 10 2005 020 155 A1, for example.

Very specific requirements arise for operating the manifold devices of a vehicle, since the operation may be carried out by the driver, amongst others. Therefore, it is very important that the operating activity does not lead to a distraction of the driver while driving. Therefore, the operating activity in particular should require as little attention by the driver as possible and in addition should be quickly accomplishable.

To provide an easy to operate user interface in a vehicle a device for detecting the position of a hand is proposed in DE 100 22 321 A1. The device comprises an apparatus for translating the detected position of the hand into an instruction to a processing unit, by means of which a vehicle function may be controlled.

SUMMARY

According to various embodiments, a method and a device can be provided, by means of which a user interface in a vehicle may be easily and intuitively controlled by a user.

According to an embodiment, in a method for providing a user interface in a vehicle,—operating objects and/or display objects are denotable on a display surface arranged in the vehicle,—a gesture is detected in a detection space, which is arranged in front of the display surface,—the detected gesture is assigned to an operating object and/or a display object and a control command, and—the control command is executed.

According to a further embodiment, the gesture may comprise a movement carried out by the hand of a user. According to a further embodiment, the operating object may comprise a motion element controllable by means of the gesture and the movement carried out during the gesture moves the motion element on the display surface, whereby the control command is generated. According to a further embodiment, a gesture may comprising a horizontal movement may be assigned to a control command, which causes showing an animated display object by means of which vehicle functions are explainable in an optical and/or acoustic manner. According to a further embodiment, it may be detected, which passenger carries out the gesture and with a waving closer gesture the animated display object is blended in and with a waving away gesture the animated display object is removed. According to a further embodiment, different display contents can be denotable simultaneously for the driver's side and the co-driver's side and a gesture comprising a horizontal movement in the direction of the co-driver is assigned to a control command that causes the display content for the driver's side also to be displayed for the co-driver's side. According to a further embodiment, on the display surface a part of a listing can be displayed in which a scrolling is producible in a scrolling direction and a scrolling is created when a gesture has been detected which comprises a movement in the scrolling direction. According to a further embodiment, an operating object for adjusting the loudness of an acoustic output can be displayed and a control command that causes the loudness to be increased is assigned to a gesture comprising a movement in a defined direction and a control command that causes the loudness to be decreased is assigned to a gesture comprising a movement in the opposite direction. According to a further embodiment, an operating object for muting of an acoustic output can be displayed and a control command that causes a muting is assigned to a gesture comprising a movement in a defined direction and a control command that neutralizes the muting is assigned to a gesture comprising a movement in the opposite direction. According to a further embodiment, an operating object for signaling an incoming telephone call can be displayed and a control command that causes the telephone call to be accepted is assigned to a gesture in which a movement is carried out that corresponds to taking off a handset.

According to another embodiment, a device for providing a user interface in a vehicle, may comprise—a display surface for displaying operating objects and/or display objects, wherein the display surface is arranged in the vehicle,—a gesture detection device for detecting gestures in a detection space that is arranged in front of the display surface,—an analysis apparatus by means of which the detected gestures may be assigned to operating objects and/or display objects and a control command, and—a control device by means of which the control command is executable.

According to a further embodiment of the device, the display surface can be configured such that different display contents simultaneously are denotable for different viewing angles.

BRIEF DESCRIPTION OF THE DRAWINGS

The invention is now described by way of exemplary embodiments with respect to the drawings.

Figure 1:
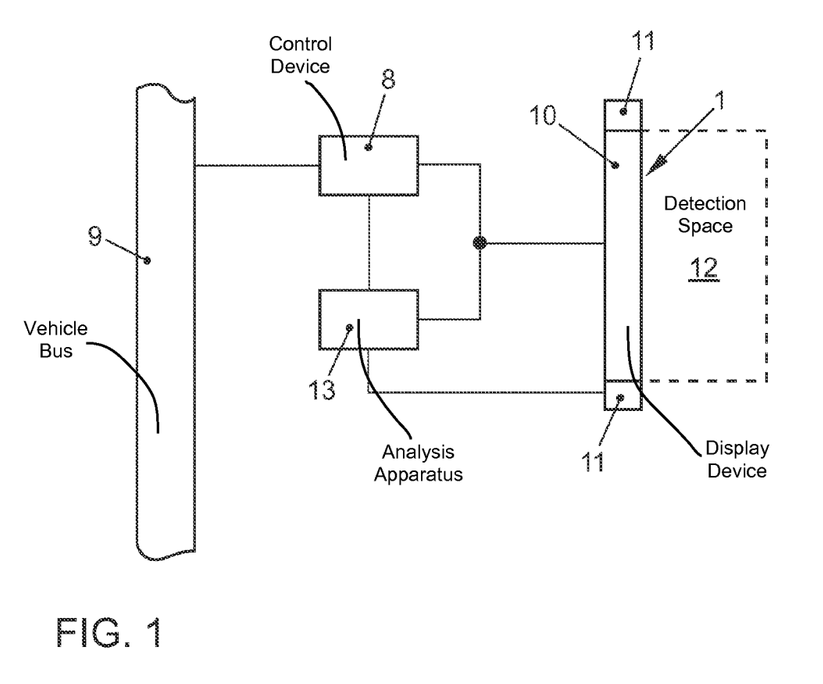
FIG. 1 schematically shows an exemplary embodiment of the device.

With respect to FIG. 1 a first exemplary embodiment of the device and the method is described:

DETAILED DESCRIPTION

In the method according to various embodiments, operating objects and/or display objects are denotable on a display surface arranged in the vehicle. Furthermore, a gesture is detected in a detection space, which is arranged in front of the display surface.

The detected gesture is assigned to an operating object and/or a display object and a control command. Subsequently, the control command is executed.

Understood as a gesture in the sense of the invention is a certain posture of the hand of a user or a certain movement, which is carried out by the hand of the user. The gestures are carried out within the detection space in front of the display surface such that no contact with the display surface is required. By means of controlling the user interface of the vehicle through gestures, the user is provided with a particularly simple and intuitive input alternative for controlling the display content on the display surface or the devices of the vehicle.

According to an embodiment of the method, the gesture comprises a movement carried out by the hand of a user. The direction of movement of the gesture in particular is connected with a direction of movement or a function, which is assigned to the gesture. In particular, the direction of movement may be directly coupled with the operating object. That is to say, the operating object may comprise a motion element controllable by means of the gesture. In this case, the movement carried out during the gesture moves the motion element on the display surface, whereby the control command is created. For example, the operating object may be a rotary control switch or a sliding switch represented on the display surface. Such an operating element may be actuated by a movement of a gesture that corresponds to sliding or rotating the operating object, wherein the respective movement is carried out contactless by the user in the detection space. Such an actuation of an operating object, which is displayed on the display surface, features the advantage that the user does not have to strike a certain surface area as for example with a touch-sensitive surface. Rather, it is sufficient that he/she moves his/her hand into the detection space and carries out the gesture assigned to the operating object there. In doing so, the gesture in particular corresponds to a movement, which, for example, is carried out with mechanical operating elements, so that the user easily may memorize these gestures.

According to a further embodiment of the method, to a gesture comprising a horizontal movement a control command is assigned that causes the presentation of an animated display object by means of which vehicle functions may be explained optically and/or acoustically. In particular, the display object is a virtual assistant or a so called avatar, respectively, which supports the passengers. For example, with a waving closer gesture the animated display object is shown, with a waving away gesture the animated display object is removed. In order to be able to decide whether the gesture is a waving closer gesture or a waving away gesture, it is detected in addition, which passenger has carried out the gesture.

According to a further embodiment of the method different display contents are denotable simultaneously for the driver's side and the co-driver's side. Therefore, the display surface is a so-called dual-view-display. In this case, assigned to a gesture comprising a horizontal movement in the direction of the co-driver may be a control command, which causes that the display content for the driver's side also is displayed for the co-driver's side. Inversely, assigned to a gesture comprising a horizontal movement in the direction of the driver may be a control command, which causes that the display content for the co-driver's side also is displayed for the driver's side.

According to a further embodiment of the method a part of a listing is displayed on the display surface. In order to show another part of the listing a scrolling in a scrolling direction is producible. With the method according to various embodiments the scrolling may be created in that a gesture is detected, which comprises a movement in the scrolling direction. For example, when a listing is shown in which the list entries are arranged vertically one below the other a scrolling may be created in that a gesture comprising a vertical movement downwards or upwards, respectively, is carried out within the detection space.

According to a further embodiment of the method an operating object for adjusting the loudness of an acoustic output is displayed. In this case, assigned to a gesture comprising a movement in an output direction is a control command, which causes the loudness to be increased, and assigned to a gesture comprising a movement in the opposite direction is a control command, which causes the loudness to be decreased.

Furthermore, an operating object for muting an acoustic output may be displayed. In this case, assigned to a gesture comprising a movement in an output direction is a control command, which causes a muting, and assigned to a gesture comprising a movement in the opposite direction is a control command, which neutralizes the muting. In particular, the direction for increasing the loudness and for neutralizing the muting is a vertical direction upwards and the opposite direction for decreasing the loudness and for muting the acoustic output is a vertical direction downwards.

According to a further embodiment of the method an operating object for signaling an incoming telephone call is displayed. In this case, assigned to a gesture during which a movement is carried out that corresponds to taking off a handset is a control command, which causes that the telephone call is accepted. Furthermore, assigned to a gesture during which a movement is carried out that corresponds to hanging up a handset may be a control command, which causes that an ongoing telephone conversation is terminated or an incoming call is rejected.

The device according to various embodiments is configured such that it may carry out the above method in part or as a whole. It comprises a display surface for displaying operating objects and/or display objects. The display surface is arranged in the vehicle. The device further comprises a gesture detection device for detecting gestures in a detection space that is arranged in front of the display surface. By means of an analysis apparatus the detected gestures may be assigned to operating objects and/or display objects as well as in addition to a control command. By means of a control device the control command may be executed.

According to an embodiment of the device the display surface is configured such that different display contents simultaneously are denotable for different viewing angles. In particular, here the viewing angles on the one hand correspond to the angle from which the driver is viewing the display surface and on the other hand to the angle from which the co-driver is viewing the display surface.

The device serves to provide a user interface in a vehicle.

It comprises a display device 10 with a display surface 1. The display surface 1 may be provided by a display of any kind of construction. The display device 10 is connected to a control device 8. The control device 8 creates graphics data, which are represented in a visible manner to the passengers in the passenger compartment of the vehicle by means of the display surface 1. In particular, operating objects and display objects for the user interface may be displayed. These operating and display objects support the user in controlling devices of the vehicle. Further, the display objects serve to communicate information.

The control device 8 further is connected to a vehicle bus 9. The control device 8 may exchange data with other devices of the vehicle in a bidirectional manner via this connection. In particular, data may be transmitted to the control device 8, which are processed by the control device 8 such that a display content is created on the display surface 1, which supports the user in controlling the vehicle equipment.

Furthermore, a gesture detection device 11 is provided, with the help of which gestures of a user may be detected in a detection space 12. The detection space 12 is arranged in front of the display surface 1. The gesture detection device 11 is part of an input device for the user interface. The user may carry out gestures in the detection space 12 to control the representation on the display surface 1 as well as to control further devices of the vehicle as described later.

For example, the gesture detection device 11 may comprise infrared light sources and detectors for infrared light. Alternatively, the gesture detection device 11 may comprise an optical system, which comprises a camera that records the gesture carried out in the detection space 12. Furthermore, the optical system may comprise a light emitting diode that, for example, emits rectangular amplitude modulated light. This light is reflected at the hand of a user who carries out the gesture in the detection space 12, and reaches a photo diode of the gesture detection device 11 after the reflection. A further light emitting diode also emits rectangular amplitude modulated light towards the photo diode, which, however, is shifted in its phase by 180°. Both of the light signals are superimposed at the photo diode and cancel each other in case they exactly feature the same amplitude. In case the signals at the photo diode do not cancel each other, the light emission of the second diode is adjusted via a control circuit such that the overall received signal again is summed up to be zero. When the position of the hand of the user in the detection space 12 is changed, also that part of the light is changed, which reaches the photo diode from the first light emitting diode via the reflection at the hand. This causes an updating of the intensity of the second light emitting diode by means of the control circuit. Therefore, the control signal is a measure for the reflection of the light emitted by the first diode at the hand of the user who carries out the gesture. In this manner, a signal may be derived from the control circuit that is representative for the position of the hand of the user.

The gesture detection device 11 is connected to the control device 8 and an analysis apparatus 13. The analysis apparatus 13 further is connected to the display device 10. The display device 10 transmits the display content to the analysis apparatus 13. Depending on the currently displayed operating object and display object, respectively, the analysis apparatus 13 assigns a control command to the detected gesture. The analysis apparatus 13 transmits this control command to the control device 8, which executes the control command. For this purpose, the control device 8 transmits respective data to the vehicle bus 9 and/or changes the display content displayed by the display surface 1.

Described in the following are various examples of gestures and the control commands assigned to these gestures in an exemplary embodiment of the method:

Displayed on the display surface 1 may be an animated display object, which optically and/or acoustically describes vehicle functions. The user may render this display object visible by carrying out a waving closer gesture in the detection space 12. Further, the user may remove this display object by carrying out a waving away gesture in the detection space 12. The waving closer or waving away gesture is detected by the gesture detection device 11 and, by means of the analysis apparatus 13, is assigned to the respective animated display object and a control command, which causes displaying or removing the animated display object. In case the gesture may be carried out by different passengers who in particular are sitting on the driver seat or the co-driver seat of the vehicle, it also may be detected, which passenger has carried out the gesture, in order to be able to detect definitely whether it is a waving closer or waving away gesture. Described below with respect to the second exemplary embodiment is how it is possible to detect, which passenger carries out a gesture.

With an operating system that is based on a hierarchical menu structure it often is the case that a listing comprising several list entries is displayed. However, since the display surface 1 is limited, in many cases only a part of the complete list is shown. In this case the necessity arises to create a scrolling of the listing to render visible other list entries. For example, when the list entries are displayed one below the other a scrolling downwards or upwards may be created. In order to create a scrolling in a downward direction the user may carry out a gesture in the detection space 12 that comprises a downward movement of the hand. In connection with the display of the listing this gesture is assigned to a control command, which causes the downward scrolling. Accordingly, a gesture comprising an upward movement in connection with the listing is interpreted such that a scrolling in an upward direction is created.

Furthermore, operating objects may be displayed on the display surface, which are actuated by means of gestures. For example, a virtual rotary switch may be displayed on the display surface 1. To actuate the rotary switch, with his hand the user carries out a clockwise rotary movement in the detection space 12 or a movement in an opposite rotary direction. In connection with the representation of the virtual rotary switch for the loudness of an acoustic output this gesture is assigned to control command, which leads to the loudness being increased or decreased. In the same manner, an operating object may be displayed for muting an acoustic output, which may be activated and again be neutralized by means of a gesture.

The control device 8 may further be coupled to a telecommunications device via the vehicle bus 9. The telecommunications device transmits a signal for an incoming call to the control device 8. Thereupon, control device 8 creates a symbol, which is displayed on the display surface 1 and that signals the incoming call. When the user now carries out a gesture in the detection space 12 that corresponds to taking off a handset, this gesture will be detected by the gesture detection device and, by the analysis apparatus 13, will be assigned to a control command, which causes the incoming call to be accepted. Accordingly, a gesture corresponding to hanging up a handset leads to an incoming call being rejected or a telecommunications connection being terminated.

By means of further movement gestures the detail of a geographic map of a navigation system may be moved, for example. Further, windows opening, which contain different information, may be closed by a movement gesture.

Finally, a gesture comprising a rotary movement of the hand may lead to a geographic map being rotated and aligned, respectively, or to a listing arranged in a perspective manner on a ring being rotated.

Figure 2:
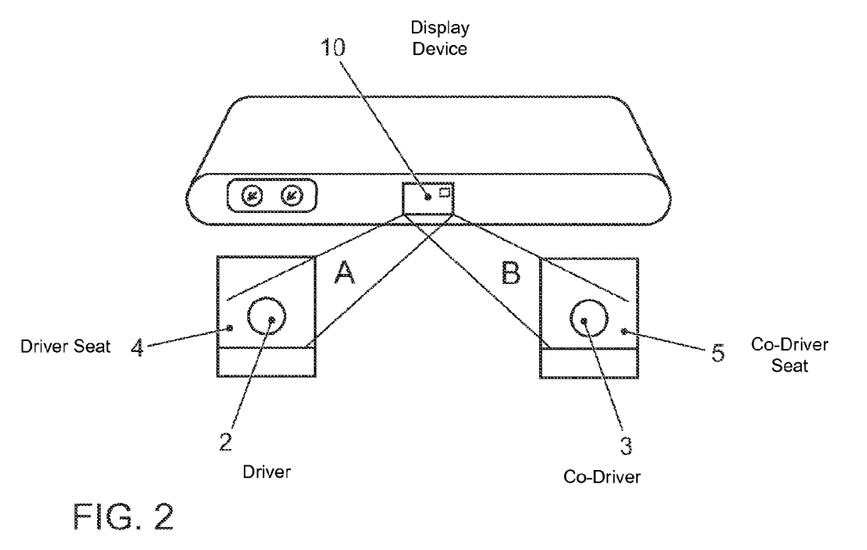
FIG. 2 shows the display device of a further exemplary embodiment of the device, and FIG. 3 schematically shows a part of the device of the further exemplary embodiment.
Figure 3:
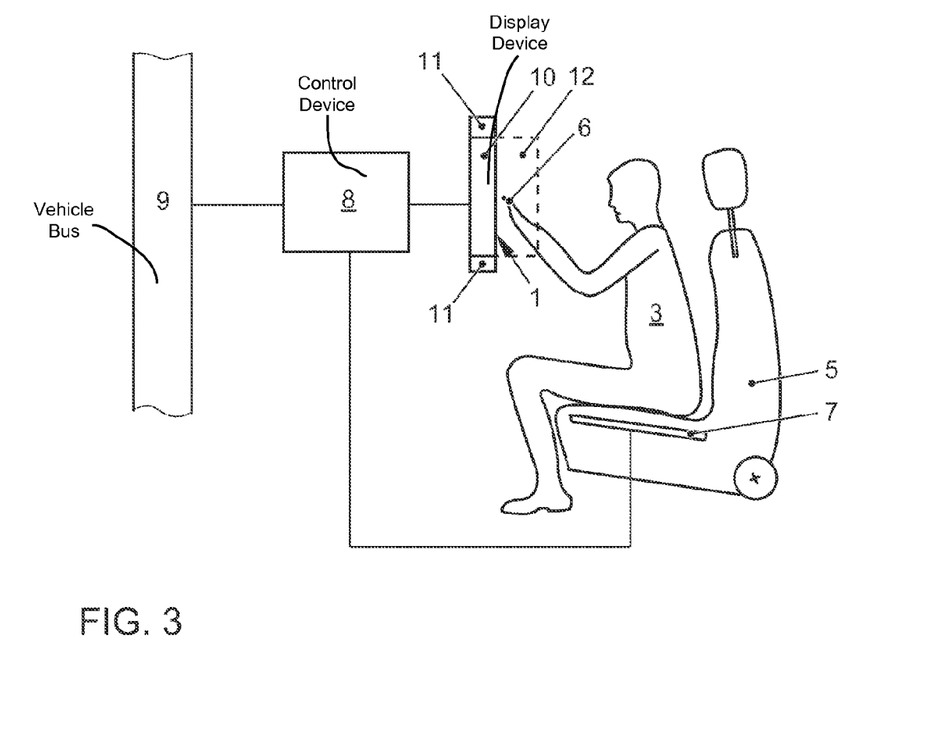

With respect to FIG. 2 and FIG. 3 a second exemplary embodiment of the device and the method is described:

The device of the further exemplary embodiment generally corresponds to the device of the first exemplary embodiment described with respect to FIG. 1. However, in the device of the further exemplary embodiment the display device 10 is configured such that different display contents are denotable simultaneously for different viewing angles A and B. Furthermore, with respect to the further exemplary embodiment a device is described, by means of which it may be detected whether the gesture in the detection space 12 is carried out by the driver 2 or the co-driver 3.

In the display surface 1 of the display device 10, by means of an optical barrier different display contents are denotable to each observer to the right and to the left of the centric line of sight. As can be seen from FIG. 2, driver 2 sitting on the driver seat 4 views the display surface 1 from the viewing angle A, however, the co-driver 3 sitting on the co-driver seat 5 views the display surface 1 from the viewing angle B. The optical barrier of the display device is arranged such that the driver 2 may see different display content in the angular range A than the co-driver 3 from the angular range B. Thus, the display device 10 may be activated by means of the control device such that different information may be displayed for the driver 2 and the co-driver 3 simultaneously.

The driver 2 or the co-driver 3, respectively, may view the display content of the respective other one by means of a gesture carried out in the detection space 12. For this purpose, the co-driver 3 for example moves his/her hand into the detection space 12 in front of the display surface 1. In doing so, his/her finger tip 6 approaches the display surface 1. The seating position of the co-driver 3, for example, who carries out a gesture, in this case may be determined as follows:

As shown in FIG. 3 an electrode device 7 is located in seat 5 of co-driver 3. By means of this electrode device 7 an identification code may be capacitively coupled into the body of the co-driver 3. In doing so, the identification code may identify the seating position of the co-driver 3 as well as the co-driver 3 him-/herself. The identification code is transmitted via the body of the co-driver 3 and is capacitively uncoupled at the finger tip 6 so that it may be transmitted to a receiving device accommodated in the display device 10.

The receiving device is connected to a control device 8, which in turn is coupled with the electrode device 7 in a capacitive manner. With the capacitive coupling between the electrode device 7 and the co-driver 3 on the one hand and the co-driver 3 and the receiving device in the display device 10 on the other hand an electric field comprising a very limited range of for example several centimeters or decimeters is used. The range of this field substantially corresponds to the size of the detection space 12. Relatively low carrier frequencies of several 100 kHz are used for signal transmission, which result in quasi static fields, i.e. fields for which extensively the physical approach is valid that is valid for static fields. With regard to further details of this signal transmission reference is made to DE 10 2004048 956 A1 and the literature cited therein, which hereby are incorporated in the present application by reference. In particular, the circuit devices used in DE 10 2004 048 956 A1 may be applied. The seating position of driver 2 may be determined in a corresponding manner.

When the co-driver 3 now carries out a gesture comprising a horizontal movement in his/her direction inside the detection space 12, this gesture is assigned to a control command, which causes that the display content currently displayed to the driver's side also is displayed for the co-driver's side, i.e. in viewing angle B. Conversely, when it is detected that the driver carries out a gesture comprising a horizontal movement towards the driver inside the detection space 12, this gesture is assigned to a control command that causes the display content of the co-driver to be displayed to the driver.

REFERENCE NUMERALS

1 display surface
2 driver
3 co-driver
4 driver seat
5 co-driver seat
6 finger tip of a user
7 electrode device
8 control device
9 vehicle bus
10 display device
11 gesture detection device
12 detection space
13 analysis apparatus

What is claimed is:

1. A method for providing a user interface in a vehicle, the method comprising:
   simultaneously displaying a driver side display view and a passenger side display view on a same display surface arranged in the vehicle, wherein the driver side display view is visible to a driver but shielded from a passenger by an optical barrier, and the passenger side display view is visible to the passenger but shielded from the driver by the optical barrier, and wherein the driver side display view and the passenger side display view include different display contents, such that different information is simultaneously displayed to the driver and the passenger, the display contents comprising at least one of operating objects and display objects;

detecting an object-related gesture in a detection space located in front of the display surface without using a contact sensor, the detected object-related gesture being related to at least one of an operating object and a display object, and identifying and executing a control command corresponding to the detected object-related gesture, detecting a view-sharing gesture in the detection space without using a contact sensor, detecting whether the driver or the passenger carries out the view-sharing gesture, identifying and executing a view-sharing command corresponding to the detected view-sharing gesture, wherein executing the view-sharing command comprises (a) when the view-sharing gesture is carried out by the passenger and comprises a horizontal movement in the direction of the passenger side, causing the current display contents of the driver side display view to also be displayed in the passenger side display view, such that the current display contents in the passenger side display view are replaced by the current display contents in the driver side display view, and (b) when the view-sharing gesture is carried out by the driver and comprises a horizontal movement in the direction of the driver side, causing the current display contents of the passenger side display view to also be displayed in the driver side display view, such that the current display contents in the driver side display view are replaced by the current display contents in the passenger side display view.

2. The method according to claim 1, wherein each of the object-related gesture and the view-sharing gesture comprises a movement carried out by the hand of a user.

3. The method according to claim 2, wherein the operating object comprises a motion element controllable by the object-related gesture and the movement carried out during the object-related gesture moves the motion element on the display surface.

4. The method according to claim 1, wherein an object-related gesture comprising a horizontal movement is assigned to the control command, which causes showing an animated display object for explaining vehicle functions in at least one of an optical and acoustic manner.

5. The method according to claim 4, comprising detecting whether the object-related gesture is performed by a driver or a passenger, and displaying an animated display in response to a waving closer gesture removing the animated display in response to a waving away gesture.

6. The method according to claim 1, wherein a part of a listing is displayed on the display surface and wherein the method comprises detecting a scrolling gesture and scrolling the displayed listing in response to detecting the scrolling gesture.

7. The method according to claim 1, wherein an operating object for adjusting the loudness of an acoustic output is displayed and a control command that causes the loudness to be increased is assigned to a gesture comprising a movement in a defined direction and a control command that causes the loudness to be decreased is assigned to a gesture comprising a movement in the opposite direction.

8. The method according to claim 1, wherein an operating object for muting of an acoustic output is displayed and a control command that causes a muting is assigned to a gesture comprising a movement in a defined direction and a control command that neutralizes the muting is assigned to a gesture comprising a movement in the opposite direction.

9. The method according to claim 1, wherein an operating object for signaling an incoming telephone call is displayed and a control command that causes the telephone call to be accepted is assigned to a gesture in which a movement is carried out that corresponds to taking off a handset.

10. The method according to claim 1, wherein the steps of detecting a view-sharing gesture in the detection space and identifying and executing a view-sharing command comprise:

identifying a driver side view-sharing gesture comprising a horizontal movement in the direction of the passenger and, in response to the detected driver side view-sharing gesture, replacing the current display contents in the passenger side display view with the current display contents in the driver side display view, or identifying a passenger side view-sharing gesture comprising a horizontal movement in the direction of the driver and, in response to the detected passenger side view-sharing gesture, replacing the current display contents in the driver side display view with the current display contents in the passenger side display view.

11. A device for providing a user interface in a vehicle, comprising:

a display surface configured to simultaneously display a driver side display view and a passenger side display view, wherein the driver side display view is visible to a driver but shielded from a passenger by an optical barrier, and the passenger side display view is visible to the passenger but shielded from the driver by the optical barrier, and wherein the driver side display view and the passenger side display view include different display contents, such that different information is simultaneously displayed to the driver and the passenger, the display contents comprising at least one of operating objects and display objects, wherein the display surface is arranged in the vehicle, a gesture detection device configured to detect object-related gestures in a detection space that is arranged in front of the display surface without using a contact sensor, each object-related gesture being related to at least one of an operating object and a display object, an analysis apparatus configured to identify a control command corresponding to each detected object-related gesture, and a control device configured to execute each control command corresponding to each detected object-related gesture, the gesture detection device further configured to detect a view-sharing gesture in the detection space and to detect whether the driver or the passenger has carried out the view-sharing gesture, the analysis apparatus further configured to identify a view-sharing command corresponding to the detected view-sharing gesture, and the control device further configured to execute the identified view-sharing command, wherein executing the view-sharing command comprises (a) when the view-sharing gesture is carried out by the passenger and comprises a horizontal movement in the direction of the passenger side, causing the current display contents of the driver side display view to also be displayed in the passenger side display view, such that the current display contents in the passenger side display view are replaced by the current display contents in the driver side display view, and (b) when the view-sharing gesture is carried out by the driver and comprises a horizontal movement in the direction of the driver side, causing the current display contents of the passenger side display view to also be displayed in the driver side display view, such that the current display contents in the driver side display view are replaced by the current display contents in the passenger side display view.

12. The device according to claim 11, wherein each of the object-related gesture and the view-sharing gesture comprises a movement carried out by the hand of a user.

13. The device according to claim 11, wherein the operating object comprises a motion element controllable by an object-related gesture and the movement carried out during the object-related gesture moves the motion element on the display surface.

14. The device according to claim 11, wherein an object-related gesture comprising a horizontal movement is assigned to the control command, which causes showing an animated display object for explaining vehicle functions in at least one of an optical and acoustic manner.

15. The device according to claim 14, wherein the device is further configured to detect whether the object-related gesture is performed by a driver or a passenger, and displaying an animated display in response to a waving closer gesture removing the animated display in response to a waving away.

16. The device according to claim 11, wherein the device is further configured to display a part of a listing is displayed on the display surface and wherein the method comprises detecting a scrolling gesture and scrolling the displayed listing in response to detecting the scrolling gesture.

17. The device according to claim 11, wherein the device is further configured to display an operating object for adjusting the loudness of an acoustic output and a control command that causes the loudness to be increased is assigned to a gesture comprising a movement in a defined direction and a control command that causes the loudness to be decreased is assigned to a gesture comprising a movement in the opposite direction.

18. The device according to claim 11, wherein the device is further configured to display an operating object for muting of an acoustic output and a control command that causes a muting is assigned to a gesture comprising a movement in a defined direction and a control command that neutralizes the muting is assigned to a gesture comprising a movement in the opposite direction.

19. The device according to claim 11, wherein the analysis apparatus and control device are configured to identify and execute a view-sharing command corresponding to the detected view-sharing gesture by:
  identifying a driver side view-sharing gesture comprising a horizontal movement in the direction of the passenger and, in response to the detected driver side view-sharing gesture, replacing the current display contents in the passenger side display view with the current display contents in the driver side display view, or
  identifying a passenger side view-sharing gesture comprising a horizontal movement in the direction of the driver and, in response to the detected passenger side view-sharing gesture, replacing the current display contents in the driver side display view with the current display contents in the passenger side display view.

\* \* \* \* \*